Aug. 2, 1927.  
E. F. ANDREWS  
1,637,795  
ELECTRODE FOR RECTIFIERS AND ELECTROLYTIC CONDENSERS  
Filed Sept. 10, 1926
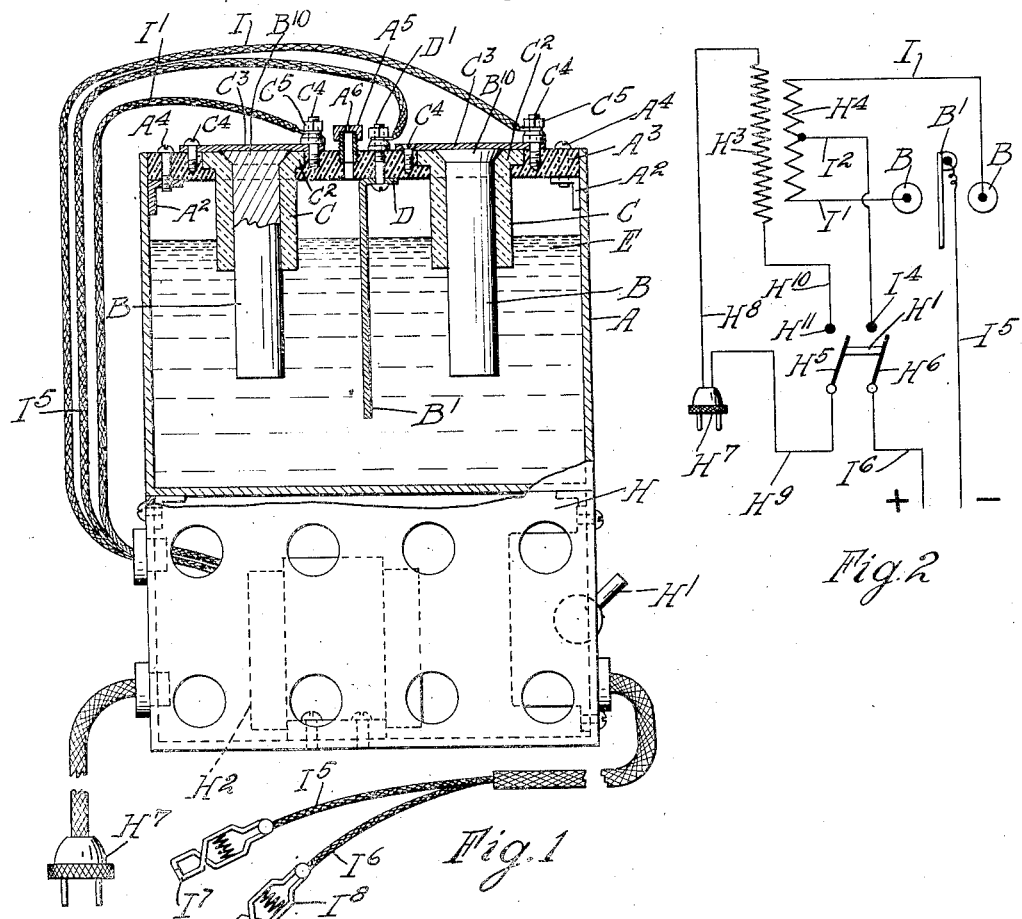
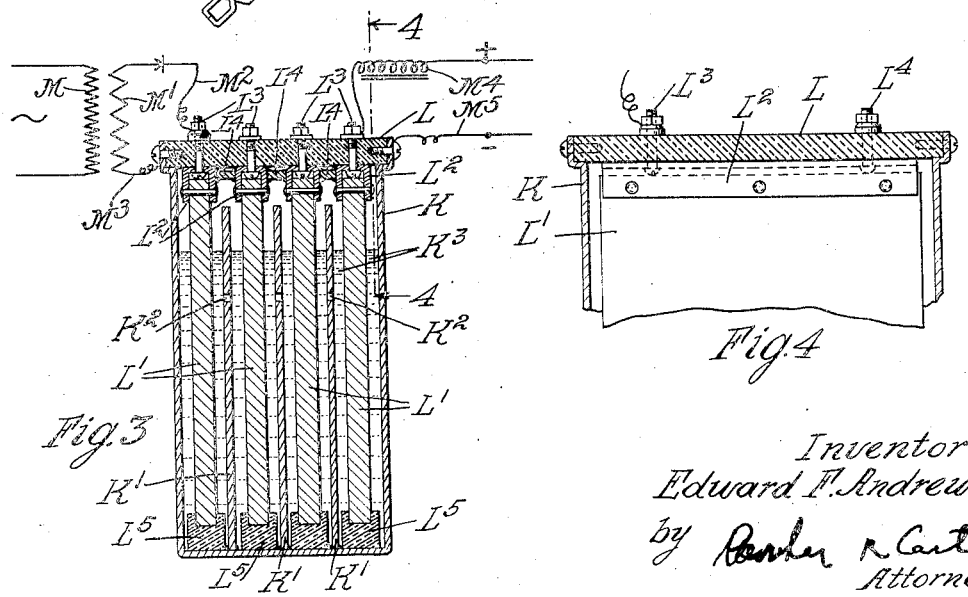
Inventor  
Edward F. Andrews  
by Parker R. Carter  
Attorneys Patented Aug. 2, 1927.

1,637,795

UNITED STATES PATENT OFFICE.

EDWARD F. ANDREWS, OF CHICAGO, ILLINOIS, ASSIGNOR TO ANDREWS-HAMMOND CORPORATION, OF CHICAGO, ILLINOIS, A CORPORATION OF ILLINOIS.

ELECTRODE FOR RECTIFIERS AND ELECTROLYTIC CONDENSERS.

Application filed September 10, 1926. Serial No. 134,651.

My invention relates to an electrode and to a substance for such electrode, which is adaptable for use with rectifiers and electrolytic condensers. I have shown it herein as applied in one instance to a battery charger or rectifier adapted to be used to charge, from a source of alternating current, storage batteries of the character used in connection with automobile starting and lighting systems, and radio equipment.

It may be adapted however, to any other purpose for which electrolytic rectifiers or condensers are required, such as the rectification of alternating currents for power purposes, the supplying of pulsating current from an alternating current source, which pulsating current can be smoothed into uniform direct current by a filter system in which this alloy may also be used for the condensers if desired. My rectifying alloy is also especially adapted for use in conjunction with electro-chemical condensers described in my co-pending application, Ser. No. 128,959, filed August 13, 1926, to form a complete source of uniform direct current deriving its power from an alternating current supply and in which the rectifier and the electro-chemical condensers operate in the same electrolyte, as set forth in the co-pending application of Laurens Hammond, Ser. No. 111,959, filed May 27, 1926.

An object of the invention when used as a rectifier is to provide an improved electrolytic rectifier which will operate in a solution of potassium hydroxide and in which both the filming and non-filming electrodes and also the electrolyte will be subject to a minimum of deterioration with age and use. A further object is to provide a rectifier having a high efficiency, which will produce a relatively large direct current with a given consumption of alternating current and in which the heat produced by the rectifier per unit of direct current delivered is low. Another object is the provision of such a rectifier, the rectifying characteristics of which shall remain relatively constant during long periods of use or after standing idle for a considerable length of time. A further object is the provision of an electrode containing the elements, magnesium and aluminum, which shall be a relatively strong and durable structural material and at the same time possess the desired rectifying properties. A further object is the provision of an electrode which when connected to the positive terminal of a direct current source and associated in an electrolyte with a suitable electrode connected to the negative terminal of said direct current source will form on its surface a non-conducting film which will almost entirely prevent the flow of direct current through the electrolyte. A further object is to provide an electrode material which possesses any or all of the above characteristics in other alkaline solutions besides potassium hydroxide and also in certain nearly neutral or neutral solutions. And still a further object is to provide a rectifying electrode composed of an alloy containing considerable quantities of aluminum and magnesium which shall have rectifying and blocking characteristics which are entirely different and altogether superior to either aluminum or magnesium itself. Another object of this invention is to provide a rectifier sufficiently permanent and sufficiently constant in its operating characteristics to adapt it for use to charge storage batteries by the so-called trickle charge method which requires the practically continuous operation of the rectifier supplying a low rate of current to the battery throughout its life.

Other objects will appear from time to time in the course of the specification and claims.

I illustrate my invention more or less diagrammatically in the accompanying drawings, wherein—

Figure 1 is a side elevation with parts in section;

Figure 2 is a wiring diagram;

Figure 3 is a section through a variant form of my invention, illustrating its use as a condenser connected across a filter circuit;

Figure 4 is an enlarged section on the line 4—4 of Figure 3.

Like parts are indicated by like symbols throughout the specification and drawings.

Referring to the drawings, A indicates the charger container which may be of any suitable material, but which is herein shown as of a metal of the iron group. About the upper edge of the container are positioned inwardly projecting ledges $A^2$, upon which is positioned any suitable cover member $A^3$, of any suitable insulating material, which may, for example, be of hard rubber, and is secured in position, for example by the screws $A^4$. It may be provided with the filler cap $A^5$, vented as at $A^6$.

The rectifying element of the charger shown in Figure 1 consists of one or more rectifying electrodes B, of a mixture or alloy of magnesium and aluminum, the proportions of which will be later discussed, and a non-rectifying electrode $B^1$, which may be of nickel or of another metal of the iron group, or of any other metal suitable for use in the particular electrolyte employed and which does not form a non-conducting film.

As an electrolyte, indicated as E, I may employ any suitable liquid or solution suitable for use with electrodes of the above metals, but I prefer to employ an alkaline solution, and in particular, a solution of potassium hydroxide.

In the preferred form of my rectifier I employ two electrodes B, each secured to the cover plate $A^3$, for example by the non-conducting bushing C with the holding rim $C^2$. $C^3$ is a metal plate engaging the upper end $B^{10}$ of the electrode. $C^4$ are securing screws one of which may serve as a binding post, when employed in connection with the nut $C^5$. The purpose of these bushings is to prevent contact between electrode and electrolyte at the surface of the electrolyte, as crystalline compounds are here formed. This structure is not essential, and, if found desirable, the electrodes may be secured to the cover without the bushings. Also a layer of mineral oil may be employed, if desired, on top of the solution, to take the place of the bushings, or both may be omitted.

Between the two magnesium aluminum alloy electrodes I position a single non-rectifying electrode $B^1$, which in the preferred form consists of a plate of nickel or nickel plated iron, or of any metal or metals of the iron group. As an example of fastening means I illustrate the plate as formed at its upper edge with a flange D, secured to the cover plate by means of the screws $D^1$.

H indicates a supplemental housing, secured to the main housing A, and preferably positioned beneath it. It may be provided with any suitable switch mechanism $H^1$, and a transformer $H^2$, the details of which form no part of the present invention. Referring to Figure 2, $H^3$ is the primary coil of the transformer and $H^4$ the secondary coil, and $H^5$ $H^6$ the two leaves of the double switch $H^1$. $H^7$ indicates a wall plug from which one conductor $H^8$ extends to the primary coil $H^3$ and another conductor $H^9$ to the switch leaf $H^5$. $H^{10}$ connects the opposite end of the coil $H^3$ with the contact $H^{11}$ which cooperates with the switch leaf $H^5$. From one end of the secondary coil $H^4$ a conductor I extends to one of the rectifying electrodes B. From the opposite end of the secondary coil the conductor $I^1$ extends to the other electrode B. Intermediate the conductor $I^2$ extends the secondary coil $H^4$ to the contact member $I^4$ adapted to cooperate with the switch leaf $H^6$. From the non-rectifying electrode $B^1$, intermediate the rectifying electrodes, extends the conductor $I^5$, the negative terminal of the device, and from the switch $H^6$ extends the conductor $I^6$ the positive terminal of the device, to which may be secured the usual clips $I^7$ $I^8$ as shown in Figure 1.

In use, the plug $H^7$ is plugged into the electric light socket, the clips $I^7$ $I^8$ are secured to the terminals of the battery to be charged, or the circuit to be supplied, and the switch $H^1$ is actuated to move the switch leaves $H^5$ $H^6$ against the contacts $H^{11}$ $I^4$ respectively.

Figure 3 indicates a condenser including a metal container K, which may for example be of nickel plated iron, having a plurality of internal transverse partitions $K^1$, which should be welded to the container and which may, if desired, be vented as at $K^2$, to permit the maintenance of the same liquid level in all compartments. $K^3$ indicates the electrolyte in the various compartments.

L is a cover of insulating material, to which are secured a plurality of electrodes $L^1$, of the magnesium and aluminum alloy elsewhere herein discussed, in the form of plates. The plates may be supported by means of the members $L^2$ and the screws or bolts $L^3$. The plates may further be connected by means of the welded pieces or low resistance conductors $L^4$, welded to each plate. $L^5$ indicates supporting or spacing blocks of any suitable insulating material which may be employed to support or to space the bottoms of the plates $L^1$.

M, $M^1$, indicate the primary and secondary coils of a transformer connected with any suitable source of alternating current. $M^2$ is a conductor extending to one of the bolts $L^3$ which serves as a binding post for the entire series of plates $L^1$. $M^3$ is a conductor extending from the transformer to the container K and thus to the partitions $K^2$ which are welded to it. $M^4$ indicates a choke coil between the transformer and the positive terminal and $M^5$ indicates a conductor extending from the container K to the negative terminal.

It will be realized that whereas I have described and shown a practical and operative device and method, nevertheless many changes might be made in the size, shape, number and disposition of parts without departing from the spirit of my invention, and I therefore wish my drawings and description to be taken as in a broad sense illustrative and diagrammatic rather than as limiting me to my specific showing herein made.

The use and operation of my invention are as follows:

Referring first to the employment of my electrode in connection with a rectifier or charger, it is well known in the art that a number of metals or substances may be used in the electrolytic rectification of alternating current for the conversion of such a current into direct current. Practical, commercial electrolytic rectification, has, so far as I am aware, been limited in the past to the use of aluminum or tantalum, as rectifying electrodes. Such other metals as possess qualities necessary for rectification, have presented difficulties which have prevented their practical and commercial use.

Tantalum, combined with some acid electrolytes, is practical and operable as a rectifier, and is not attacked to an appreciable extent by these electrolytes. However it is a rare and expensive metal, difficult to obtain and hard to handle. Beside which it quickly disintegrates in for example an alkaline electrolyte of sodium or potassium hydroxide.

Aluminum rectifies satisfactorily in some solutions, but under long continued use the characteristics of the rectifier change, owing to a number of causes, all of which tend to reduce the amount of current which will pass through such a rectifier. When an aluminum electrode stands idle, a non-conductive coating is formed of such a nature and to such a depth as to necessitate the removal and cleaning as a condition of further continued use. Furthermore, aluminum rectifiers do not maintain constant current characteristics. Also aluminum is violently attacked by electrolytes consisting of sodium or potassium hydroxide, and rectifies only slightly in these electrolytes.

The use of a magnesium electrode in a variety of solutions is disclosed and claimed in the co-pending application Ser. No. 111,959, filed by Laurens Hammond on May 27, 1926. Whatever may be the advantages of a magnesium electrode, such an electrode wastes in the course of its use and deposits a voluminous precipitate which necessitates a large container to receive it. The life of the rectifier is necessarily limited to the life of the electrode, and the size of the electrode must be increased.

In order to construct a complete device for producing a uniform direct current from alternating current, such as described in the co-pending application of Mr. Laurens Hammond, Serial No. 111,959, filed May 27, 1926, utilizing the electro-chemical condenser described in my co-pending application above referred to, it is desirable to have a rectifier which will employ a solution of potassium hydroxide or sodium hydroxide as the electrolyte, particularly potassium hydroxide, as this seems to be the best electrolyte for the above mentioned electro-chemical condenser. This also has the advantage of having a very high conductivity. Whereas the magnesium rectifier will not operate in potassium hydroxide, this electrolyte is extremely well adapted for use with a rectifying electrode composed of an alloy containing considerable quantities of aluminium and magnesium, or consisting entirely of these two substances, as long as the percentage of aluminum is greater than fifteen per cent. Although a certain degrees of rectification can be had with less than fifteen per cent aluminum, the rectifying action is relatively unstable in potassium hydroxide. An alloy consisting of about equal parts of each of the above mentioned substances seems to be fully as good as any other from the point of view of its rectifying qualities alone. The essential difference of the rectification process produced by the addition of aluminum to magnesium is illustrated by the fact that if a clean alloy containing ten per cent of aluminum, the balance magnesium, is placed in an electrolyte of potassium carbonate, in which pure magnesium rectifies the best, it will not rectify at all. With high percentages of aluminum the alloy will rectify in carbonates. The efficiency of my alloy rectifier is very considerably greater than magnesium in carbonates, and its tendency to heat up is correspondingly less. The throwing down of a heavy precipitate from the surface of the rectifying electrode together with its erosion, so characteristic of the magnesium rectifier, is almost totally absent when fifty per cent of aluminum is employed and is extremely slight with thirty-three per cent of aluminum.

The proportions of aluminum and magnesium employed in my rectifying electrode can be established in a general way by the following considerations: If magnesium is the principal constituent, then aluminum must be present in sufficient quantities as to have a substantial effect on the rectifying characteristics. With potassium hydroxide as an electrolyte consistent, continuous, rectification cannot be had with much less than fifteen per cent of aluminum. If aluminum is the principal constituent and the electrolyte is potassium hydroxide enough magnesium must be added to prevent the electrolyte from dissolving the electrode, as pure aluminum is attacked very rapidly by potassium hydroxide and most other alkalis. 33 1/3 per cent of magnesium is sufficient for this purpose, in fact a smaller amount may suffice. The mechanical characteristics of aluminum magnesium alloys are however an important factor in deciding upon the proportions to be used in the manufacture of practical electrodes. Aluminum alloys containing more than 15 per cent of magnesium have a very low ductility and magnesium alloys having above 15 per cent of aluminum also lack ductility. It appears necessary however to approach more nearly equal proportions than represented by 15 per cent, 85 per cent alloys, in order to secure the most desirable characteristics for rectification. A 50—50 magnesium aluminum alloy is a very good rectifier but is extremely brittle and porous. This alloy when used as an electrode is very apt to crack off in large pieces. A 66 2/3 per cent aluminum and 33 1/3 per cent magnesium alloy is also a good rectifier but crumbles easily and is disintegrated to some extent by the rectifying action. However an alloy consisting of 33 1/3 per cent aluminum and 66 2/3 per cent magnesium or thereabouts has very good rectifying properties in potassium hydroxide and is also amply strong for making practical electrodes, although it is quite hard and crystalline. The above discussion relates, as to the specific proportions mentioned, primarily to the use of my electrode in an electrolyte consisting of solutions of potassium or sodium hydroxide. It will be understood, however, that I do not limit myself to the use of such solutions, and that the proportions of the magnesium aluminum alloy may vary widely, particularly when the alloy is employed with other electrolytes. It will be understood therefore that I do not wish to limit myself to the specific proportions or ranges above referred to, or to any specific proportion or range.

The mechanical properties of the alloy can also be to some extent controlled by the addition of other substances or metals which do not directly affect the rectifying characteristics. One such metal is cadmium, the addition of which decreases the brittleness and reduces the porosity of the cast metal. I do not wish to be limited to any specific proportion of cadmium, since the proportion may be varied to suit the particular conditions or desired consistency. I have found by experiment that an alloy consisting of 3 35/100 parts of aluminum, 3 35/100 parts of magnesium and one part of cadmium will produce an electrode which is very satisfactory as far as its rectifying qualities are concerned but which has the objection of being somewhat too brittle. When this electrode is used in potassium hydroxide with the nickel non-rectifying electrode the solution remains almost perfectly clear and there is practically no precipitate. This brittleness can be overcome by the addition of larger percentages of cadmium with the aluminum and magnesium content remaining equal. I do not wish however to be limited to any specific proportions of these three metals as desirable results can be obtained through a wide range of proportions.

It is highly essential in producing rectifying electrodes of this character to have the metal as uniform as possible, clean, pure, and free from blow holes and oxide inclusions. If such defects are present the electrode will sometimes crumble away during rectification around points that lack homogeneity.

As a non-rectifying electrode I may employ a considerable range of metals, but I find that when a nickel plate or member is used in a potassium hydroxide electrolyte, a rectifier is formed which is very stable in its rectifying characteristics, and which appears to be unusually permanent, the rectifying electrode being attacked only to a very small extent, and the non-rectifying electrode scarcely at all. In general the aluminum magnesium alloy electrode has the advantage that its rectifying characteristics are constant and do not change with age.

An important advantage of the use of my electrode with the potassium hydroxide solution comes from the fact that such solution is of low resistance or high conductivity.

The aluminum magnesium alloy when used as the positive electrode in an electrolytic cell will block a direct current almost completely. It may therefore unlike pure magnesium be employed as an electrolytic condenser. This quality also serves to prevent the discharge of a storage battery which is being charged by such a rectifier through the rectifier if the alternating current supply to the rectifier is interrupted. I may, however, if it is desired to prevent absolutely all leakage from the storage battery employ the double switch structure and circuit described herein and shown in Figure 2, although this might not ordinarily be necessary.

I claim:

1. An electrode for an electrolytic apparatus, which consists of an alloy of magnesium, aluminum and cadmium.

2. An electrode for an electrolytic apparatus, which consists of an alloy of magnesium, aluminum, and additional consistency controlling material.

3. An electrode for an electrolytic apparatus, which consists of an alloy including magnesium, aluminum and cadmium in effective proportions.

4. An electrode for an electrolytic apparatus, which consists of an alloy having more than twenty-three per cent of magnesium and less than seventy-seven per cent of aluminum, associated with an electrode of a metal of the iron group, in an electrolyte of potassium hydroxide.

5. An electrode for electrolytic rectifiers and condensers which includes an alloy having more than twenty-three per cent of magnesium and less than seventy-seven per cent of aluminum, associated with an electrode of a metal of the iron group, in an electrolyte containing a hydroxide of an alkali metal in effective proportion.

6. In an electrode for electrolytic rectifiers and condensers which includes an alloy having more than twenty-three per cent of magnesium and less than seventy-seven per cent of aluminum, associated with an electrode including in effective proportion a metal of the iron group, in an electrolyte containing a hydroxide of an alkali metal in effective proportion.

7. An electrode for electrolytic rectifiers and condensers, which includes magnesium and aluminum in effective proportions, said electrode containing less than thirty-three and one-third per cent of magnesium and more than twenty-three per cent, in an electrolyte containing a hydroxide of an alkali metal in effective proportion.

8. An electrode for electrolytic rectifiers and condensers, comprising a magnesium aluminum alloy containing more than twenty-three per cent of magnesium, in an electrolyte containing a hydroxide of an alkali metal in effective proportion.

9. An electrode for electrolytic rectifiers and condensers, which includes magnesium and aluminum in effective proportions, said electrode containing less than thirty-three and one-third per cent of magnesium and more than twenty-three per cent, associated with an electrode including in effective proportion a metal of the iron group, in an electrolyte containing a hydroxide of an alkali metal in effective proportion.

10. An electrode for electrolytic rectifiers and condensers, comprising a magnesium aluminum alloy containing more than twenty-three per cent of magnesium, associated with an electrode including in effective proportion a metal of the iron group, in an electrolyte containing a hydroxide of an alkali metal in effective proportion.

11. An electrode for electrolytic rectifiers and condensers, which includes magnesium and aluminum in effective proportions, said electrode containing less than thirty-three and one-third per cent of magnesium and more than twenty-three per cent, associated with a nickel electrode, in an alkali metal hydroxide electrolyte.

12. An electrode for electrolytic rectifiers and condensers, comprising a magnesium aluminum alloy containing more than twenty-three per cent of magnesium, associated with a nickel electrode, in an alkali metal hydroxide electrolyte.

13. In an electrolytic film forming apparatus an electrode which consists of an alloy of aluminum and magnesium having not less than 23 percent of magnesium.

14. In an electrolytic film forming apparatus an electrode which consists of an alloy of magnesium and aluminum having not less than 23 percent of magnesium, and an electrode of a metal of the iron group in an alkaline electrolyte.

15. In an electrolytic rectifier or condenser an electrode which consists of an alloy of magnesium and aluminum having not less than 23 percent of magnesium, an electrode including in effective proportion a metal of the iron group.

16. In an electrolytic rectifier or condenser a rectifying electrode which consists of an alloy of aluminum and magnesium having not less than 23 percent of magnesium.

17. In an electrolytic rectifier or condenser a rectifying electrode which consists of an alloy of aluminum and magnesium having not less than 23 percent of magnesium and a non-rectifying electrode containing a metal of the iron group.

Signed at Chicago, county of Cook and State of Illinois, this 26th day of August, 1926.

EDWARD F. ANDREWS.